United States Patent [19]

Lloyd

[11] 3,747,616
[45] July 24, 1973

[54] EARTHQUAKE SENSITIVE SHUT-OFF VALVE

[76] Inventor: Hershall E. Lloyd, 4255 N. Tyler, El Monte, Calif. 91731

[22] Filed: Nov. 15, 1971

[21] Appl. No.: 198,733

[52] U.S. Cl. .............................................. 137/38
[51] Int. Cl. ............................................. F16k 17/36
[58] Field of Search ................. 137/38, 39, 40, 43, 137/456, DIG. 2; 200/61.45 R, 61.52, DIG. 20

[56] References Cited
UNITED STATES PATENTS

| | | | |
|---|---|---|---|
| 2,585,316 | 2/1952 | Hobson | 137/38 |
| 2,215,044 | 9/1940 | Kammerdiner | 137/38 |
| 679,687 | 7/1901 | Simpson | 137/DIG. 2 |
| 1,742,685 | 1/1930 | Brandon | 137/38 |
| 940,438 | 11/1909 | Davis | 137/DIG. 2 |

Primary Examiner—Robert G. Nilson
Assistant Examiner—Edward Look
Attorney—William H. Maxwell

[57] ABSTRACT

A normally open shut-off valve unit that responds to vibrations of disaster magnitude, to close a fluid line, and which involves a single moving part in the form of a valve element that is manually set for normal open operation, the valve unit involving a leveled valve body with a lateral housing, an inclined bar having a saddle formed of related inclined planes upon which the valve element is normally mounted with point contact out of the flow passage through the unit, there being a seat in said flow passage to receive and support the valve element when it is shaken and thereby demounted from the saddle to close the said flow passage. Retractile remounting means operates through the seat to reposition the valve element on the saddle.

5 Claims, 5 Drawing Figures

Patented July 24, 1973
3,747,616
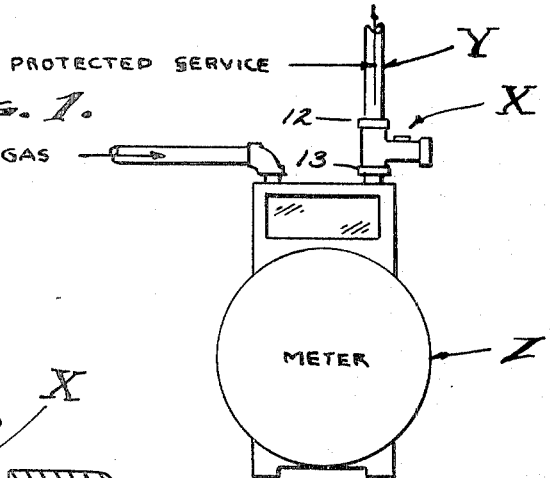
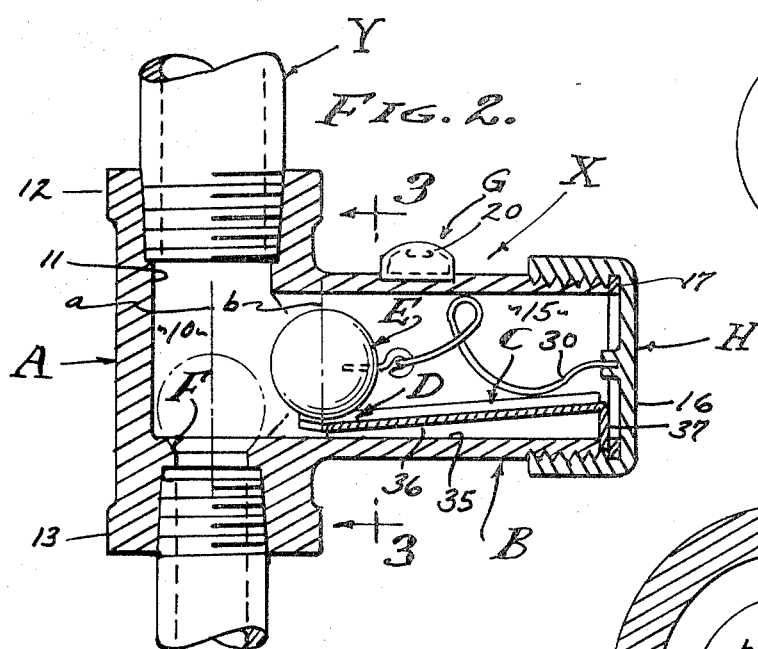
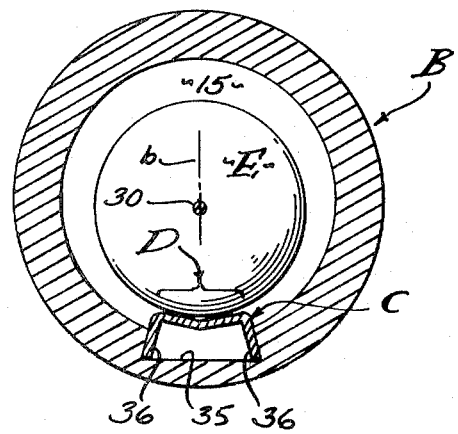
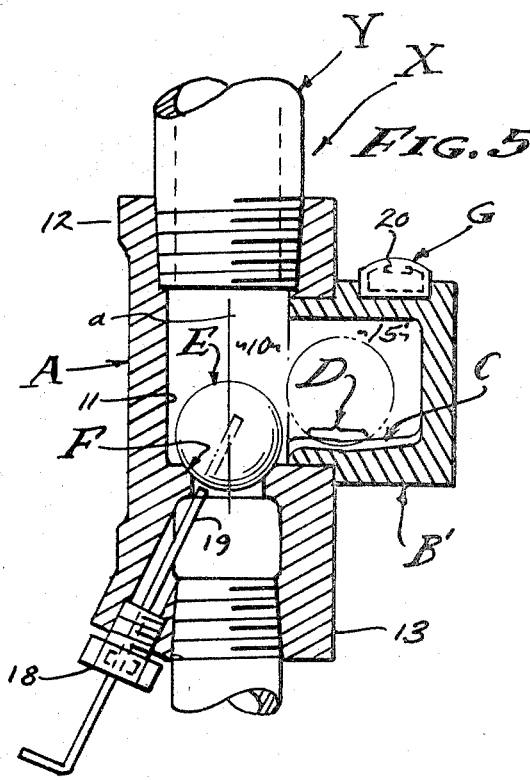
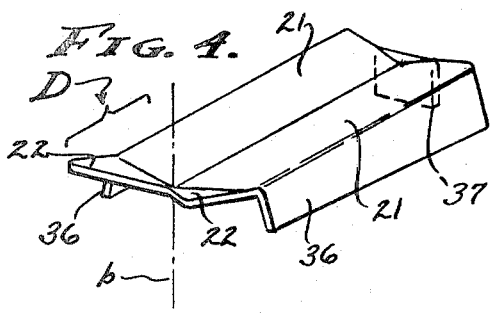

EARTHQUAKE SENSITIVE SHUT-OFF VALVE

BACKGROUND:

Disasterous earthquakes are infrequent but dangerous, and a consequence is damage to structural things and among which are the fluid supplies to buildings and the like. It is to be understood, however, that the present unit has other uses and is not to be limited to natural earth shaking for its operation, for example a shake as caused by an explosion is a force that will operate the valve unit to shut off. However, the particular valve herein disclosed will be described as a gas safety valve adapted to be installed at the delivery side of a service meter supplying a dwelling or home, or any like service. It is this type of service which is most common and which requires very little attention, but which is nevertheless subject to dangerous conditions such as when earthquakes occur or when a line opening or failure occurs which cannot be immediately corrected. In the latter situation it is a simple matter to jar the valve unit herein disclosed and thereby deliberately shut off the flow of gas. And, heretofore the complexities of devices involving levers and diaphragms and the like in valves for this purpose have been impractical; and therefore the present inventive concept with its single accessible moving part is most practical and its operation obvious and infallible.

FIELD OF INVENTION

This invention relates to fluid control valves and in particular to valves which are normally open and which are committed to closing when sufficient vibration of predetermined magnitude occurs to operate the valve element to be demounted from a saddle and subsequently seated for fluid stoppage. Therefore, it is an object to provide a safety valve unit that responds to substantial shaking and which is operative thereby to close a fluid passage therethrough.

It is an object of this invention to provide a valve unit of the type referred to which is manually set for normal free flow operation. With the valve unit hereinafter disclosed there is a lateral housing wherein the valve element is mounted on a saddle where it is manually placed with or without such aids as are shown in the two forms of invention disclosed.

It is also an object of this invention to provide a valve unit of the type referred to which is installed properly with facility, there being means incorporated therein to level the housing in which the inclined bar and associated saddle are accurately oriented relative to gravity.

It is still another object of this invention to provide a very practical and fool proof valve unit of the character thus far described the operation of which is fully apparent upon examination and which is certain to operate as expected; to remain open during normal operation through inconsequential low magnitude shocks; and to operate to close when shocks of predetermined severity occur.

SUMMARY OF INVENTION

This earthquake sensitive shut-off valve involves a safety valve unit X that is to be installed in the delivery line Y issuing from a service meter Z; for example from a gas meter where low pressure (½ lb. per sq. in.) gas is issued into a dwelling or home. The usual pipe nipples and/or unions are employed in making the installation, and the only requirement in this respect is that the safety valve unit X is to be installed with its axis $a$ disposed vertically. Referring now to unit X, there is a body A with a housing B extending laterally therefrom to house an inclined bar C and its associated saddle D upon which the valve element E is normally mounted, there being a seat F in the body A to receive the valve element E when it is demounted from said saddle. Vertical disposition of the body A and a corresponding horizontal disposition of the inclined bar C and saddle D is assured by provision of level means G incorporated in the body A, and access into the body A and/or housing B is provided by means H which permits mounting of the valve element E upon the saddle D.

DRAWINGS

The various objects and features of this invention will be fully understood from the following detailed description of the typical preferred forms and applications thereof, through which description reference is made to the accompanying drawings, in which:

FIG. 1 shows a typical installation of the earthquake sensitive shut-off valve of the present invention.

FIG. 2 is an enlarged sectional view of the valve, shown in the normal operating condition.

FIG. 3 is an enlarged detailed sectional view taken as indicated by line 3—3 on FIG. 2.

FIG. 4 is a fragmentary perspective view showing the saddle portion of the inclined bar which characterizes the present invention. And, FIG. 5 is a view similar to FIG. 2 showing the valve in the operated shut-off condition.

PREFERRED EMBODIMENT

The safety valve unit X is adapted to be incorporated in the plumbing that handles the fluid supply which is to be protected from disasterous occurrences such as earthquakes and the like. The unit X is therefore a piece of hardware that is permanent in nature and which is installed in a pipe line to pass fluid under normal conditions and to stop the flow of said fluid in the event of vibration or shaking reaching and/or exceeding a predetermined value. For example, earthquakes are evaluated according to intensity and the magnitude thereof is comparable with a number on the Richter scale; and therefore the pitch of inclined bar C and corresponding configuration of its saddle D hereinafter described are determined by the magnitude of shock or vibration required to demount the valve element E that is cooperatively associated therewith. It is to be understood that the magnitude of vibration required for said demounting can be designed into the unit as circumstances require.

The body A is characterized by its vertical disposition on axis $a$ and by a flow passage 10 extending therethrough along said axis. As shown, the body A is cylindrical with an inner diameter wall 11 extending between coupling means 12 and 13 in the top and bottom ends thereof. In the case of plumbing with pipe, the coupling means 12 and 13 are tapered pipe threads receiving the terminal complementary end portions of two vertically disposed sections of pipe to be connected for delivery of fluid; and as is clearly illustrated the flow passage 10 is straight through and unobstructed and in open connection with said sections of pipe. A feature of the body A is the seat F that is provided therein to receive the valve element E for stopping flow through the unit, the seat F comprising an upwardly faced annular shoulder located at the lower end of the body A immediately above the coupling means 13. In practice, the seat F is angularly disposed for tangential engagement with the curvature of the valve element E so as to have annular interface engagement therewith.

The housing B is preferably an integral part of the body A and provides a laterally disposed chamber 15 open into the flow passage 10 and configured to accommodate the valve element E mounted upon the saddle D of inclined bar C. The means for mounting the valve element E can vary as shown by the two forms of invention illustrated, and in which case the configuration of the chamber and housing can vary. In the first form as shown in FIG. 2 the body B is a laterally open chamber 15 closed by a removeable cap 16 providing access for remounting the valve element E and for exchanging inclined bars C which may be selected as required by Richter scale values; and in this form the housing B is a horizontally disposed tubular extension with the cap 16 secured over its open outer end by means of screw threads with a seal 17 for fluid tightness. In the second form as shown in FIG. 5 the body B' has a lateral chamber 15' and is devoid of a cap and wherein remounting means for the valve element E comprises a gland 18 located below seat F and normally closing an opening through which a retractile rod-shaped instrument 19 can be diagonally projected from beneath and through the seat F to lift the valve element E onto the saddle D.

The inclined bar C and its saddle D are positioned in chamber 15 (15') to mount the valve element E out of alignment with flow passage 10. In practice, the element E is mounted entirely within the confines of housing 13 and out of said flow passage. In accordance with the invention, the valve element E is spherical and of a diameter free to pass within the inner diameter wall 11 of the passage 10; and also free within the confines of housing B. That is, the spherical ball-shaped valve element E is moveably unrestricted and detachable from the body and housing structure, being guided therein along axis $a$ by close conformity to the inner diameter wall 11.

In accordance with the invention, the valve element E is made of a heavy metal so as to engage on a seat F with a force in excess of pressure exerted by the fluid pressure to be stopped. Thus, the valve element E will fall into said engagement upon seat F and thereby stop the fluid flow upwardly through the unit X. In the event that normal flow is downward through the unit X, the fluid pressure simply adds to the interface pressure of the engagement of element E upon seat F.

In accordance with the invention, the inclined bar C is disposed so as to roll the valve element E toward the axis $a$. Accordingly, the body A and housing B must be suitably leveled, and to this end the level means G is provided to indicate the vertical disposition of axis $a$ and corresponding inclination of bar C. In the preferred form, a spirit level 20 is fixed into the unit overlying the housing B, wherein a bubble is visible to be centered for erecting the structure with reasonable accuracy.

Inclined bar C is preferably a track that extends upwardly and away from axis $a$ at an acute angle of inclination, and such as to ensure rolling of the valve element E toward the terminal inner end of the bar for mounting upon the saddle D. As shown, the track of bar C is longitudinally straight and is transversely concaved with angularly disposed plane sides 21 in opposition to each other as is shown, so as to direct movement of the valve element E. In the preferred embodiment, the sides 21 are inclined at the same angle as the longitudinal inclination of bar C. The said acute angle of inclination is then reversed at the inner end of the bar C and all of which provides the saddle D which normally retains the valve element E in the housing B. As shown, the inner end portions of the sides 21 are up-turned at 22 at acute angles complementary to the inclination of bar C. That is, the portions 22 are angularly disposed planar extensions turned upwardly and; toward the axis $a$ at the same angular degree as the aforementioned sides 21 of the track, whereby the interface supporting point contact engagements of spherical valve element E upon the pair of sides 21 and pair of portions 22 thereof are uniformly spaced from the vertical center line $b$ of the spherical element. It will be observed that the lateral placement of the interface supporting engagement of the valve element E upon the saddle support points is in radial symmetry about the vertical center line $b$ extending perpendicularly through the spherical valve element E; and, it is through this supporting symmetry and selected uniform angles of incidence that a predetermined amplitude of vibration in the form of a lateral accelerations or decelerations is employed with predetermined accuracy to demount the valve element for its subsequent fall onto seat F to close the flow passage 10.

The inclined bar C can be integrally formed in the body A and/or housing B as shown in FIG. 5; or it can be a replaceably exchangeable part as shown in FIG. 2. In carrying out this invention, the inclined bar C is fabricated separate from the unit body and housing and it is carried in the chamber 15 by a receptacle 35 provided to capture the bar in working position. As shown, the inclined bar C and its associated saddle D are integrally formed as a sheet metal part having depending side walls 36 that are divergent so as to slideably engage with opposed dove-tailed walls of the receptacle 35. However, the inclined bar can be fabricated as by casting or machining, or any other method as may be desired. The inward-outward positioning of the inclined bar C is established by a tab 37 depending therefrom and which is engageable in a complementary recess to be captured by installing the cap 16 thereover. Thus, the inclined bar C can be selectively exchanged without manual adjustments and as may be required.

The means H is provided to withdraw the valve element E from its seated engagement within body A and is shown as a lanyard 30 anchored to the cap 16 and coupled to the valve element E to lift the same into the housing B.

From the foregoing it will be seen that the single moving part of the safety valve unit X is a spherical ball-shaped element E which is normally supported within the lateral housing B removed from the flow of fluid through passage 10. Vertical motions are not to be instrumental in dislodging the valve element E from the saddle D, while lateral accelerations and decelerations of predetermined magnitude will do so. The direction or axis of earth shaking movements (or the like) can affect the safety unit X from all quarters; to directly or indirectly demount the valve element E. That is, the spherical element can be displaced inwardly off of the inclined bar C, or to either side thereof, or the element can roll outwardly and upwardly in which case it must eventually return with added impetious as caused by momentum gained in rolling downwardly and inwardly. In any case, the angular incidence of the opposite sides 21 and complementary extensions 22 thereof, is determinable of the force required to demount the valve element E by means of omni direction accelerations and decelerations. Thus, the delivery line Y from a service meter Z is shut-off as a result of severe shaking and as a precaution against disasterous results which would otherwise follow by maintaining an open line Y.

Having described only typical preferred forms and applications of my invention, I do not wish to be limited or restricted to the specific details herein set forth, but wish to reserve to myself any modifications or variations that may appear to those skilled in the art:

I claim:

1. A normally open shut-off valve sensitive to close in response to horizontal accelerations and/or decelerations and including; a body having a flow passage therethrough and extending through an upwardly faced valve seat disposed on a vertical axis, a housing adjacent to the body and having a closed chamber opening into the flow passage above said valve seat, a spherical valve element, an inclined bar supported in the chamber of the housing and having two complementary portions and one of which extends upwardly and outwardly from a horizontal plane normal to the first mentioned vertical axis and the other of which terminates at the innermost end of the bar and extends upwardly and inwardly at the same angle as the said one portion to cooperatively engage with and to form an upwardly faced saddle to support the valve element said valve element being normally mounted upon the saddle formed on the inclined bar and displaceable therefrom and moveable freely from the housing chamber and through the flow passage to have annular interengagement upon said valve seat to close the flow passage.

2. The shut-off valve as set forth in claim 1 wherein the inclined bar is V-shaped in transverse cross section having opposite planar sides disposed at the same angle to a horizontal plane normal to the first mentioned vertical axis as the angle of said upward inclination of the two complementary portions thereof, so as to tangentially engage the spherical valve element.

3. The shut-off valve as set forth in claim 1 wherein a plug is removeable from an opening through the body below the valve seat for access of an instrument projected therethrough and through the valve seat to lift and thereby remount the spherical valve element.

4. The shut-off valve as set forth in claim 1 wherein the chamber is closed by a cap for access therein, and wherein the inclined bar is removeably mounted in the housing.

5. The shut-off valve as set forth in claim 1 wherein the housing chamber is closed by a cap for access to a receptacle therein, and wherein the inclined bar is removeably received in said receptacle.

* * * * *